United States Patent
Nakanuma (10) Patent No.: US 9,986,157 B2
(45) Date of Patent: May 29, 2018

(54) IMAGING OPTICAL SYSTEM, CAMERA APPARATUS AND STEREO CAMERA APPARATUS

(71) Applicant: Hiroshi Nakanuma, Kanagawa (JP)

(72) Inventor: Hiroshi Nakanuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 8 days.

(21) Appl. No.: 14/990,111

(22) Filed: Jan. 7, 2016

(65) Prior Publication Data

US 2016/0195716 A1    Jul. 7, 2016

(30) Foreign Application Priority Data

Jan. 7, 2015    (JP) ................. 2015-001542

(51) Int. Cl.
| | |
|---|---|
| G02B 9/62 | (2006.01) |
| H04N 5/232 | (2006.01) |
| G02B 13/00 | (2006.01) |
| G02B 13/04 | (2006.01) |
| G03B 35/00 | (2006.01) |

(52) U.S. Cl.
CPC ..... *H04N 5/23238* (2013.01); *G02B 13/0045* (2013.01); *G02B 13/04* (2013.01); *G03B 35/00* (2013.01)

(58) Field of Classification Search
CPC ... G02B 9/00; G02B 9/04; G02B 9/06; G02B 9/08; G02B 9/60; G02B 9/62; G02B 13/00; G02B 13/001; G02B 13/0015; G02B 13/0045; G02B 13/005
See application file for complete search history.

(56) References Cited

U.S. PATENT DOCUMENTS

| | | | | |
|---|---|---|---|---|
| 2,922,337 A * | 1/1960 | Glatzel | .................. | G02B 13/04 359/753 |
| 5,963,381 A * | 10/1999 | Ori | ........................... | G02B 9/60 359/752 |
| 6,101,045 A * | 8/2000 | Konno | .................. | G02B 15/163 359/684 |

(Continued)

FOREIGN PATENT DOCUMENTS

| | | |
|---|---|---|
| JP | 2004-341376 | 12/2004 |
| JP | 2006-309076 | 11/2006 |
| JP | 2012-220741 | 11/2012 |

*Primary Examiner* — Thong Nguyen
(74) *Attorney, Agent, or Firm* — Oblon, McClelland, Maier & Neustadt, L.L.P.

(57) ABSTRACT

A single focal imaging optical system includes, in order from an object side, a first lens group with a positive power, an aperture stop, and a second lens group with a positive power. The first lens group includes a first front lens group and a first rear lens group. The first front lens group includes a negative lens having a concave surface on an image side and a positive meniscus lens having a concave surface on the object side. The first rear lens group includes a biconvex lens. The second lens group includes a second front lens group with a negative power and a second rear lens group with a positive power. The system satisfies a following condition: 3.2<f2/f1<9.0, where f1 represents a composite focal length of the first lens group and f2 represents a composite focal length of the second lens group.

10 Claims, 10 Drawing Sheets

(56) References Cited

U.S. PATENT DOCUMENTS

| | | | |
|---|---|---|---|
| 6,377,404 B1* | 4/2002 | Goosey, Jr. | G02B 13/04 359/682 |
| 2004/0130799 A1* | 7/2004 | Kreitzer | G02B 9/10 359/651 |
| 2008/0068939 A1 | 3/2008 | Tanaka et al. | |
| 2008/0174887 A1* | 7/2008 | Asami | G02B 13/06 359/761 |
| 2009/0323482 A1 | 12/2009 | Nakanuma | |
| 2010/0027136 A1* | 2/2010 | Ohashi | G02B 13/04 359/753 |
| 2010/0103539 A1* | 4/2010 | Kitahara | G02B 9/60 359/794 |
| 2013/0057732 A1* | 3/2013 | Uemura | H04N 13/0217 348/240.3 |
| 2014/0071026 A1 | 3/2014 | Hatashita et al. | |
| 2015/0362699 A1 | 12/2015 | Nakanuma | |
| 2016/0085055 A1* | 3/2016 | Asami | G02B 9/64 359/755 |

* cited by examiner

IMAGING OPTICAL SYSTEM, CAMERA APPARATUS AND STEREO CAMERA APPARATUS

CROSS-REFERENCE TO RELATED APPLICATION

The present application is based on and claims priority to Japanese patent application No. 2015-001542, filed Jan. 7, 2015, the disclosure of which is hereby incorporated by reference herein in its entirety.

BACKGROUND

Technical Field

The present invention relates to an imaging optical system, a camera apparatus, and a stereo camera apparatus.

Description of Related Art

As camera apparatuses including imaging optical systems and area sensors, monitoring cameras, vehicle-mounted cameras, and the like are practically being used. These cameras are used for sensing purpose, i.e., to identify an object. For instance a vehicle-mounted camera is used to identify a position of the traveling vehicle, a road condition, and the like.

Here, the imaging optical systems for sensing purpose must have a high resolution so as to identify relatively a small object or to monitor a condition of an object from a relatively long distance.

As imaging optical systems provided to camera apparatuses for sensing purpose, retrofocus-type imaging optical systems are taught by PTL1 (JP2006-309076A), PTL2 (JP2004-341376A), and PTL3 (JP2012-220741A). The image optical systems of the PTLs 1 to 3 have a front lens group with a negative power on the object side and a rear lens group with a positive power on the image side (i.e., the front lens group and the rear lens group are aligned in an asymmetrical manner). As a result, the camera secures an enough space to dispose filters such as an optical low pass filter and an infrared cut filter between the optical system and the image sensors, thereby achieving an appropriate optical performance for sensing.

Further, the optical systems for sensing purpose are required to accurately identify the sizes, shapes, and the like of the objects. Hence, the distortion aberrations must appropriately be corrected even for wide angle cameras. Therefore, it is desirable to develop an imaging optical system that can reduce distortions, thereby achieving low distortion.

SUMMARY

An object of the present invention is, therefore, to provide an imaging optical system that can achieve low distortions with a wide viewing angle.

To achieve the above object, an aspect of the present invention provides a single focal imaging optical system includes, in order from an object side, a first lens group with a positive refractive power, an aperture stop, and a second lens group with a positive refractive power. The first lens group includes, in order form the object side, a first front lens group with a negative refractive power and a first rear lens group with a positive refractive power. The first front lens group includes one negative lens and one positive lens, and the first rear lens group being a single lens. The first front lens group includes, in order from the object side, a negative lens having a concave surface on an image side and a positive meniscus lens having a concave surface on the object side. The first rear lens group includes a biconvex lens, and the second lens group includes, in order from the object side, a second front lens group with a negative refractive power and a second rear lens group with a positive refractive power. The imaging optical system satisfies a following condition (1):

$$3.2 < f2/f1 < 9.0 \quad (1)$$

where f1 represents a composite focal length of the first lens group and f2 represents a composite focal length of the second lens group.

DETAILED DESCRIPTION

Hereinafter, embodiments of an imaging optical system according to the present invention will be explained with reference to the drawings. The imaging optical systems according to the embodiments are applicable to a camera apparatus or a stereo camera apparatus used for sensing purpose (for instance, a monitoring camera and a vehicle-mounted camera). Note that the imaging optical systems of the embodiments may be applicable for purposes other than sensing. For instance, the systems may be used for digital cameras to capture static images and/or videos, for film cameras using silver salt films, and the like.

As shown in FIGS. 1 to 4, the imaging optical system according to the embodiments of the present invention is a single focal optical system and includes, in order from the object side, a first lens group G1 with a positive power (positive refractive power) and a second lens group G2 with a positive power. The system includes an aperture stop S between the first and second lens groups G1, G2. That is, the imaging optical system according to the present invention is configured to include the first lens group with a positive power and being disposed on the object side with respect to the aperture stop S and the second lens group G2 with a positive power and being disposed on the image side with respect to the aperture stop S.

The first lens group G1 includes, in order from the object side, a first front lens group FG1 with a negative power and a first rear lens group RG1 with a positive power. The first front lens group FG1 is formed of a positive lens and a negative lens, while the first rear lens group RG1 is formed on a single positive lens.

The first front lens group FG1 of the first lens group G1 includes a negative lens L11 having a concave surface on the image side and a positive meniscus lens L12 having a concave surface on the object side. The first rear lens group RG1 includes a biconvex lens L13.

The second lens group G2 includes, in order from the object side, a second front lens group FG2 with a negative power and a second rear lens group RG2 with a positive power.

The imaging optical system according to the embodiments of the present invention is classified in retrofocus-type imaging optical systems. For retrofocus-type imaging optical systems, expanding a viewing angle to achieve a wide viewing angle and a large diameter generally makes difficult to correct aberrations. Namely, the retrofocus-type imaging optical system includes a front lens group with a negative power on the object side and a rear lens group with a positive power on the image side such that the retrofocus-type imaging optical system are aligned in an asymmetrical manner. As a result, distortion aberrations and/or magnification chromatic aberrations tend to occur in the retrofocus-type imaging optical systems. Further, since the retrofocus-type imaging optical systems achieve a long back focus by increasing the negative refractive power of the front lens group on the object side, it increases aberrations and therefore makes difficult to correct the aberrations in a well-balanced way.

However, the imaging optical system according to the embodiments of the present invention is configured as explained above (i.e., the imaging optical system is configured as a retrofocus-type lens and includes the first front lens group FG1 with a negative power on the object side, a first rear lens group RG1 with a positive power, and the second lens group G2 with a positive power on the image side) such that it can achieve a low distortion with a small size while having a relatively wide viewing angle.

The first lens group G1 with a positive power includes a plurality of lenses with at least one positive lens (e.g., the positive meniscus lens L12 of FIGS. 1 to 4) so as to suppress occurrence of a distortion aberration in the first lens group G1. The first front lens group FG1 has a negative power as a whole, i.e., the first front lens group includes at least one negative lens (e.g., the negative lens L11 of FIGS. 1 to 4). Accordingly, astigmatism aberrations, distortion aberrations, and chromatic aberrations can be corrected appropriately.

The first front lens group FG1 has a negative refractive power as a whole. By disposing the lens group with a negative power on the object side with respect to the aperture stop S, it becomes possible to achieve a wide viewing angle with a relatively small size.

Distortion aberrations are appropriately corrected by the first front lens group FG1 and the first rear lens group RG1. In order to keep the balance of the distortion aberration in the first lens group G1, the first front lens group FG1 includes the negative lens L11 and the single positive meniscus lens L12. The meniscus lens L12 has the concave surface on the object side to decrease a Petzval sum of the first lens group G1, thereby reducing a field curvature.

By having a positive refractive power, the first rear lens group RG1 can correct the spherical aberration caused by the large diameter. Further, the first rear lens group RG1 can correct the distortion aberration by including a relatively thick positive lens (e.g., the biconvex lens L13) close to the aperture stop S.

The second lens group G2 has a positive refractive power as a whole. The second front lens group FG2 can correct a spherical aberration and a chromatic aberration. The second front lens group FG2 includes at least one negative lens (e.g. a biconcave lens L21) to generate a negative spherical aberration so as to correct or compensate spherical aberrations caused in the whole system while suppressing an influence on the off-axial aberrations.

By having a positive refractive power, the second rear lens group RG2 can correct the aberrations occurred in the lens groups disposed on the object side with respect to the second rear lens group RG2. Besides, with the positive refractive power, the second rear lens group RG2 secures an exit pupil distance. When the second rear lens group RG2 includes a positive meniscus lens L22 having a convex surface on the image side, the second rear lens group RG2 can suppress the spherical aberration. Further, the aberrations between the second rear lens group RG2 and the negative lens L11 of the first lens group G1 can be balanced. As a result, it can reduce the off-axial aberrations that occur at positions away from the optical axis.

To enhance the above effects, the second lens group G2 preferably includes, in order from the object side, the second front lens group FG2 having the biconcave lens L21 and a second rear lens group RG2. Here, the second rear lens group RG2 includes the positive lens L22 having the convex surface on the image side and a positive lens L23 having a convex surface on the object side.

As mentioned above, the imaging optical system according to the embodiments of the present invention can achieve a high imaging performance by correcting the aberrations appropriately. As a result, it can achieve a low distortion while having a relatively wide viewing angle.

Further, the imaging optical system according to the embodiments of the present invention satisfies the following condition (1):

$$3.2 < f2/f1 < 9.0 \tag{1}$$

where "f1" represents a composite focal length of the first lens group G1 and "f2" represents a composite focal length of the second lens group G2.

The condition (1) defines an adequate range of the power balance between the first lens group G1 and the second lens group G2. When the positive power of the first lens group G1 increases and therefore the condition (1) exceeds the upper limit value, the field curvature and astigmatism aberration increase. As a result, it becomes difficult to correct them. When the positive power of the second lens group G2 increases and the condition (1) becomes smaller than the lower limit value, the spherical aberration increases. As a result, the imaging optical system may be unable to achieve the enough back focus.

As described above, the imaging optical system according to the embodiments of the present invention can correct the aberrations appropriately. Further, the imaging optical system can achieve a wide viewing angle having a half viewing angle of about 30 degree with a small size. In addition, the imaging optical system can reduce the distortion up to about 2%. Consequently, the imaging optical system of the embodiments of the present invention can achieve a high imaging performance. Therefore, the imaging optical system according to the embodiments of the present invention is applicable to camera apparatuses such as monitoring cameras and vehicle-mounted cameras, and/or stereo camera apparatuses.

Hereinafter, embodiment of the imaging optical system according to the embodiments of the present invention will be described in detail.

In the imaging optical system according to the embodiments of the present invention, it is preferable to have glass spherical lenses for all lenses. For vehicle-mounted cameras, the imaging optical systems are required to be highly reliable against environmental changes. If plastic lenses, which have greater linear-expansion rate than that of the glass lenses, are used for the vehicle mounted cameras, the optical system may not achieve a required optical performance since the lenses may be deformed by heat. Also, the environmental changes may cause a coat cracking on the plastic lens surface.

By having the glass spherical lenses for all lenses in the optical system, it can suppress deformation and expansion of the lenses even under a high temperature. That is, the imaging optical system can achieve a high reliability against environmental changes. As a result, the imaging optical system according to the embodiment of the present invention can have an excellent environmental resistance while achieving a low distortion with a relatively wide viewing angle.

In the imaging optical system according to the embodiments of the present invention, it is further preferable to satisfy the following conditions (2) and (3):

$$-5.7 < f1F/f < -2.8 \quad (2)$$

$$0.7 < f1R/f < 1.4 \quad (3)$$

where "f" represents the focal length for a d-line of the entire system, f1F represents a focal length of the first front lens group FG1, and f1R represents a focal length of the first rear lens group RG1.

The condition (2) defines an adequate range of the positive power of the first front lens group FG1 against the focal length f of the entire imaging optical system. When the condition (2) exceeds the upper value, the positive power of the first front lens group FG1 decreases, resulting in increasing the astigmatism aberrations and distortion aberrations in the entire imaging optical system. Further, it may result increasing the diameter of the positive lens of the first front lens group FG1, making difficult to shorten the overall length of the lenses of the imaging optical system. When the negative power of the first front lens group FG1 increases, it can secure an enough back focus. However, it makes difficult to correct the spherical aberration, field curvature, and distortion aberration sufficiently.

When the condition (2) becomes smaller than the lower limit value, the positive power of the first front lens group FG1 increases. As a result, it makes difficult to correct, especially the astigmatism aberration and distortion aberration for the entire imaging optical system. Further, it makes difficult to secure the enough back focus.

The condition (3) defines an adequate range of the negative power of the first rear lens group RG1 against the focal length f of the entire imaging optical system. When the condition (3) becomes smaller than the lower limit value, the positive power of the first rear lens group RG1 increases. As a result, it may increase the spherical aberration and distortion aberration. Besides, it makes difficult to keep the balance between the first rear lens group RG1 and the first front lens group FG1, resulting in increasing the distortion aberration. When the condition (3) exceeds the upper limit value, the negative power of the first rear lens group decreases. As a result, it also makes difficult to keep the balance of the aberrations, resulting in increasing the spherical aberration and distortion aberration.

In the imaging optical system according to the embodiments of the present invention, it is further preferable if an air interval d2 between the first front lens group FG1 and the first rear lens group RG1 is widest among all air intervals in the first lens group G1. By setting the air interval d2 to be the widest among all the intervals in the first lens group G1, it can easily correct the field curvature while securing the sufficient viewing angle. Besides, it can also correct the aberrations such as the spherical aberration.

In the imaging optical system according to the embodiments of the present invention, it is further preferable to satisfy the following condition (4):

$$3.0 < L/f < 5.9 \quad (4)$$

where L represents a distance from the lens end on the object side of the first lens group G1 to the image plane I.

The condition (4) defines an adequate range of the total optical length (i.e., the distance L from the lens end of the first lens group G1 to the image plane I) against the focal length f of the imaging optical system. When the condition (4) exceeds the upper limit value, it becomes easy to correct distortion aberration but become difficult to correct chromatic aberration and lateral aberration. Besides, since the total optical length (i.e., the distance L) becomes long, it may become difficult to downside the imaging optical system. When the condition (4) becomes smaller than the lower limit value, the refractive power of the entire system becomes large. Hence, it may become difficult to correct spherical aberration and distortion aberration so that it may not be able to achieve the desired imaging performance.

The camera apparatus according to the embodiments of the present invention includes the above-mentioned imaging optical system. With this, it becomes possible to achieve a low distortion and to photograph high quality images while having a relatively wide viewing angle with a small size. Namely, it is possible to use the camera apparatuses for sensing purpose (for instance, monitoring cameras, and the like). It is further preferable to have a function for converting the imaging images into digital image information so as to be more applicable for the sensing technology such as image analysis and image processing.

Further, the stereo camera apparatus according to the embodiments of the present invention includes the above-mentioned imaging optical system. With this, it becomes possible to achieve a low distortion and to photograph high quality images while having a relatively wide viewing angle with a small size. Namely, it is possible to use the camera apparatuses for sensing purpose (for instance, monitoring cameras, and the like). It is also further preferable for the stereo camera apparatus to have the function for converting the imaging images into digital image information so as to be more applicable for the sensing technology such as image analysis and image processing.

FIGS. 1 to 4 are views showing the optical arrangements of lenses of the imaging optical system according to first to fourth embodiments of the present invention. In FIGS. 1 to 4, the left side of the paper is the object side, while the right side of the paper is the image side. Here, the lenses are arranged from the object side to the image side.

Each of the imaging optical systems according to the embodiments 1 to 4, which is respectively shown in FIGS. 1 to 4, includes, in order from the object side, the first lens group G1 with a positive power, the aperture stop S, and the second lens group G2 with a positive power.

The first lens group G1 includes, in order from the object side, the first front lens group FG1 and the first rear lens group RG1. The first front lens group FG1 includes, in order from the object side, a negative meniscus lens L11 having a concave surface on the image side and a positive meniscus lens L12 having a concave surface on the object side. The first rear lens group RG1 includes a biconvex lens L13.

The second lens group G2 includes, in order from the object side, the second front lens group FG2 and the second rear lens group RG2. The second front lens group FG2 includes the biconcave lens L21. The second rear lens group RG2 includes, in order from the object side, the positive lens L22 having a convex surface on the image side and the positive lens L23 having a convex surface on the object side. Note the positive lenses L22 of the embodiments 1 to 3 are positive meniscus lenses having a convex surface on the image side.

In the embodiments 1 to 4, the lenses L11, L12, L13, L21, L22, and L23 are all glass spherical lenses. In FIGS. 1 to 4, reference sign d1 denotes an air interval between the negative meniscus lens L11 and the positive meniscus lens L12, and reference sign d2 denotes an air interval between the positive meniscus lens L12 and the biconvex meniscus lens L13, i.e., an air interval between the first front lens group FG1 and the first rear lens group RG1. Reference sign d3 denotes an air interval between the biconvex lens L13 and the biconcave lens L21, reference sign d4 denotes an air interval between the biconcave lens L21 and the positive lens L22, and reference sign d5 denotes an air interval between the positive lens L22 and the positive lens L23. In the embodiments 1 to 4, the air interval d2 is the largest among the all other air intervals in the first lens group G1.

In FIGS. 1 to 4, an optical element F1 disposed on the image plane side I with respect to the positive lens L23 is illustrated as a single transparent parallel flat plate optically equivalent to a cover glass (sealing glass) of the light-receiving imaging element such as a complementary metal-oxide semiconductor (CMOS) image sensor and a charge-coupled device (CCD) image sensor.

In the embodiments 2 to 4, the imaging optical systems further include filters such as an optical low-pass filter and a UV cut filter. An optical element F2 represents these filters in FIGS. 2 to 4.

In the following description, f represents the focal length of the imaging optical system, F represents an F-number, ω represents the half-viewing angle, r represents a curvature radius, d represents an interval between surfaces, Nd represents a refractive power, and νd represents Abbe number.

Embodiment 1

Figure 1:
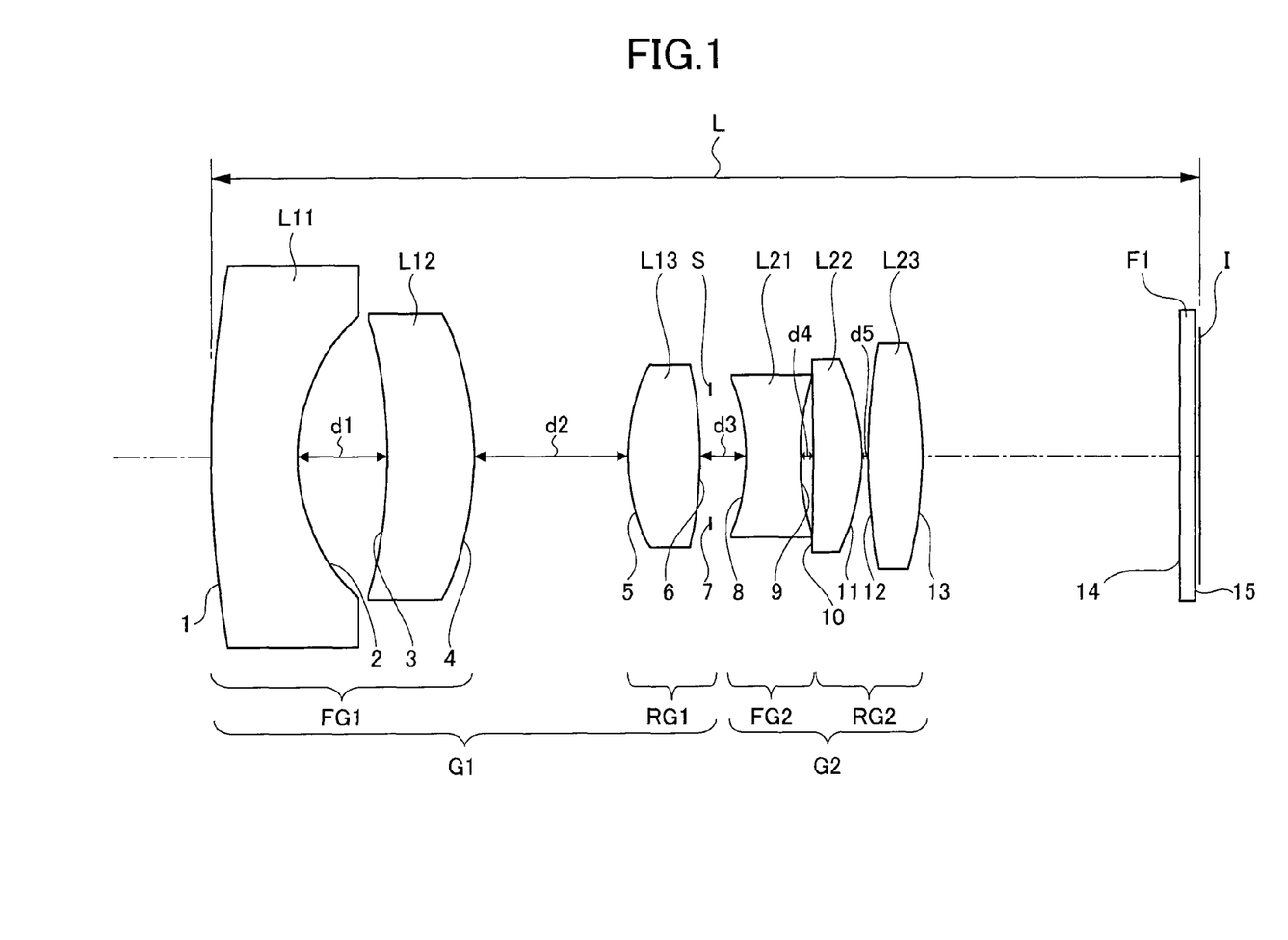
FIG. 1 is a view showing an optical arrangement of lenses of an imaging optical system according to a first embodiment of the present invention.

A numerical example of the imaging optical system according to the first embodiment shown in FIG. 1 will be described. The following Table 1 shows optical properties of the optical elements. In Table 1 and the tables of the other embodiments, "curvature radius r=∞", means a flat surface.

TABLE 1

| SURFACE NO | r | d | Nd | νd |
| --- | --- | --- | --- | --- |
| 1 | 28.53 | 2.45 | 1.7148 | 47.3 |
| 2 | 5.13 | 2.52 | | |
| 3 | −13.72 | 2.50 | 1.7552 | 27.6 |

TABLE 1-continued

| SURFACE NO | r | d | Nd | νd |
| --- | --- | --- | --- | --- |
| 4 | −8.70 | 4.34 | | |
| 5 | 5.41 | 2.04 | 1.5646 | 61.6 |
| 6 | −10.63 | 0.27 | | |
| 7 | ∞ | 1.04 | | |
| 8 | −5.04 | 1.53 | 1.7187 | 29.2 |
| 9 | 7.67 | 0.36 | | |
| 10 | −51.17 | 1.37 | 1.6167 | 60.5 |
| 11 | −5.64 | 0.20 | | |
| 12 | 18.39 | 1.53 | 1.6264 | 59.1 |
| 13 | −11.56 | 7.28 | | |
| 14 | ∞ | 0.40 | 1.5163 | 64.1 |
| 15 | ∞ | 0.15 | | |

The focal length f of the imaging optical system is expressed as: f=6.20, F=2.8, ω=26.3.

Figure 5:
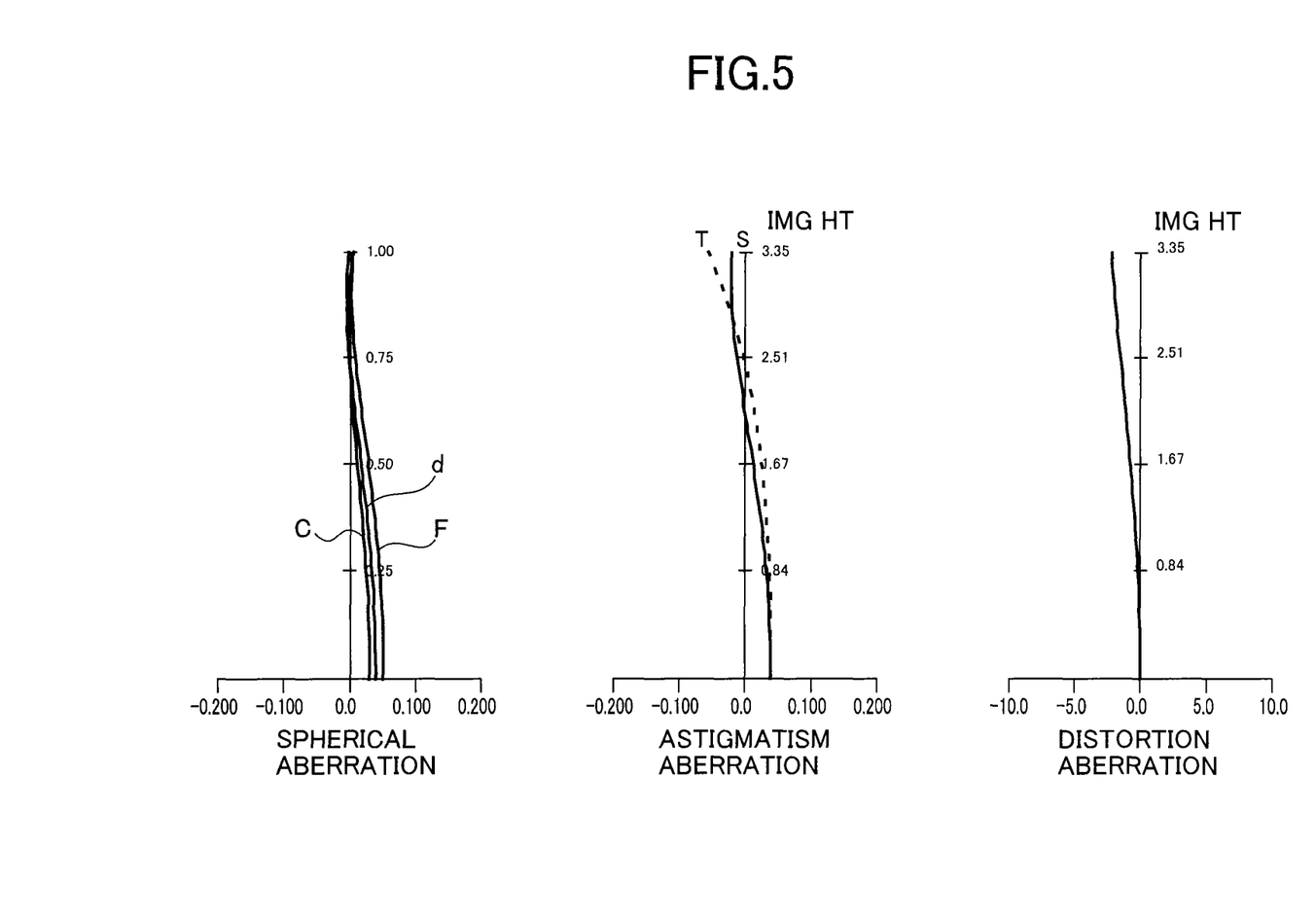
FIG. 5 is a view showing aberration curves of the imaging optical system according to the first embodiment.

FIG. 5 shows an aberration graph of a spherical aberration curve, an astigmatism aberration curve, and a distortion aberration curve of the imaging optical system according to the first embodiment when focusing on infinity. For each curve, reference sign d represents the d-line (λ=656.3 nm), reference sign c represents the c-line (i.e., λ=435.8 nm), and reference sign F represents F-line (λ=486.1 nm). Solid lines in the aberration graphs represent sagittal aberrations and dashed lines therein represent meridional aberrations. Note that aberration graphs for other Embodiments are drawn in the same manner.

Embodiment 2

Figure 2:
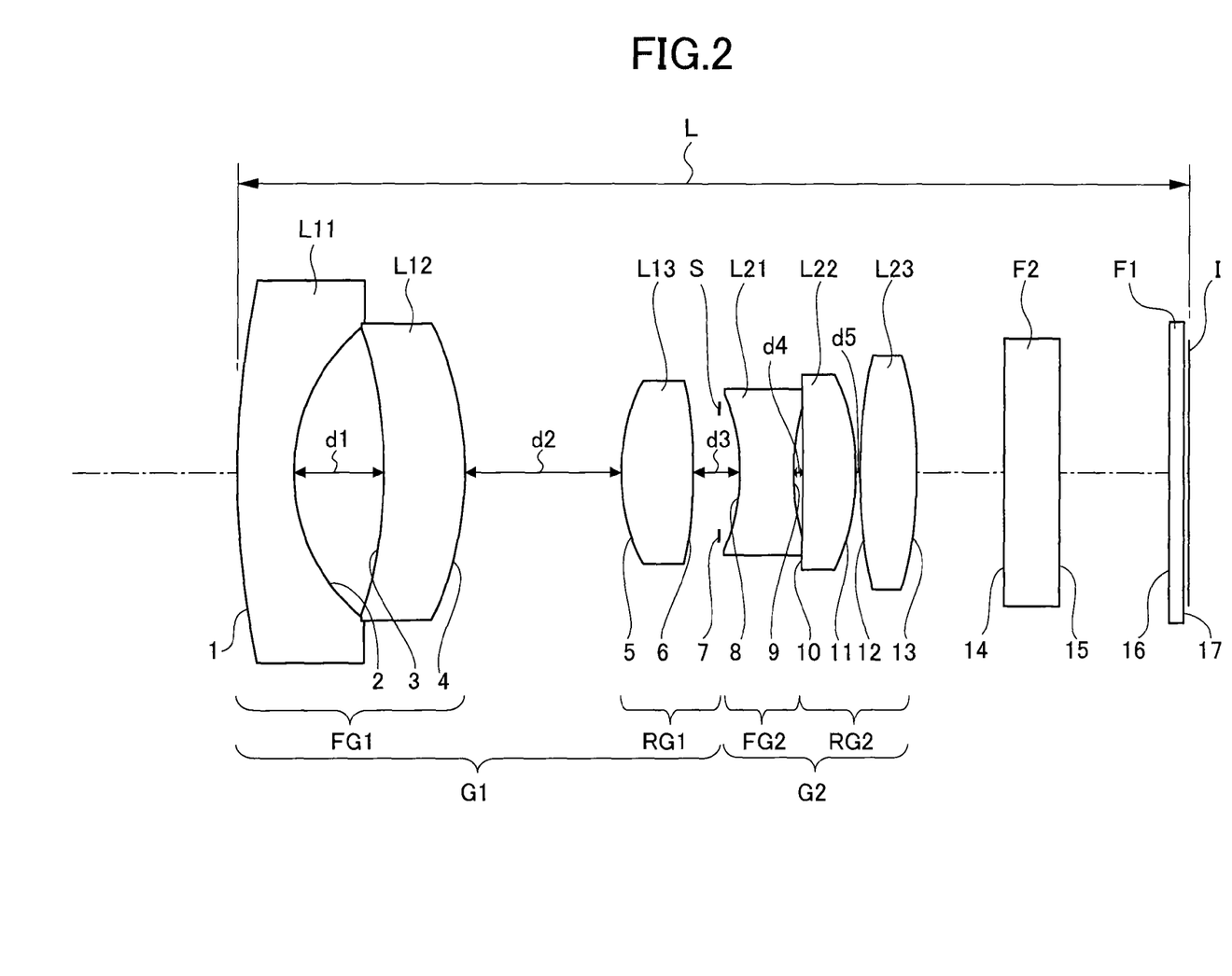
FIG. 2 is a view showing an optical arrangement of lenses of an imaging optical system according to a second embodiment of the present invention.
Figure 6:
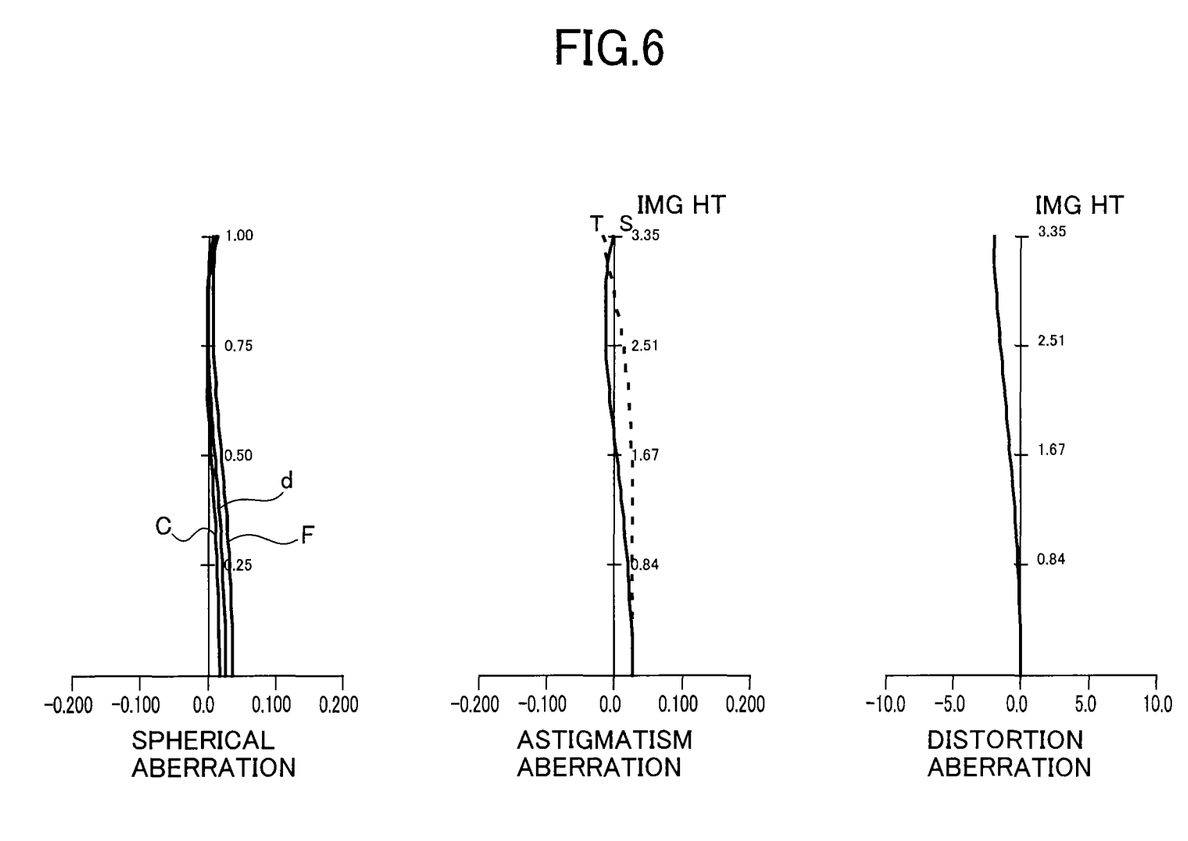
FIG. 6 is a view showing aberration curves of the imaging optical system according to the second embodiment.

A numerical example of the imaging optical system according to the second embodiment shown in FIG. 2 will be described. The following Table 2 shows optical properties of the optical elements. Further, FIG. 6 shows the aberration graph of a spherical aberration curve, an astigmatism aberration curve, and a distortion aberration curve of the imaging optical system according to the second embodiment.

TABLE 2

| SURFACE NO | r | d | Nd | νd |
| --- | --- | --- | --- | --- |
| 1 | 23.98 | 1.55 | 1.6204 | 60.3 |
| 2 | 4.91 | 2.44 | | |
| 3 | −12.59 | 2.21 | 1.7519 | 31.0 |
| 4 | −8.87 | 4.28 | | |
| 5 | 5.21 | 1.97 | 1.6204 | 60.3 |
| 6 | −12.14 | 0.73 | | |
| 7 | ∞ | 0.56 | | |
| 8 | −5.12 | 1.47 | 1.7552 | 27.6 |
| 9 | 7.04 | 0.26 | | |
| 10 | −35.76 | 1.45 | 1.7138 | 47.4 |
| 11 | −5.95 | 0.10 | | |
| 12 | 13.86 | 1.55 | 1.6353 | 57.5 |
| 13 | −12.17 | 2.37 | | |
| 14 | ∞ | 1.50 | 1.5168 | 64.2 |
| 15 | ∞ | 3.00 | | |
| 16 | ∞ | 0.40 | 1.5168 | 64.2 |
| 17 | ∞ | 0.15 | | |

The focal length f of the imaging optical system is expressed as: f=6.0, F=2.6, ω=27.0.

Embodiment 3

Figure 3:
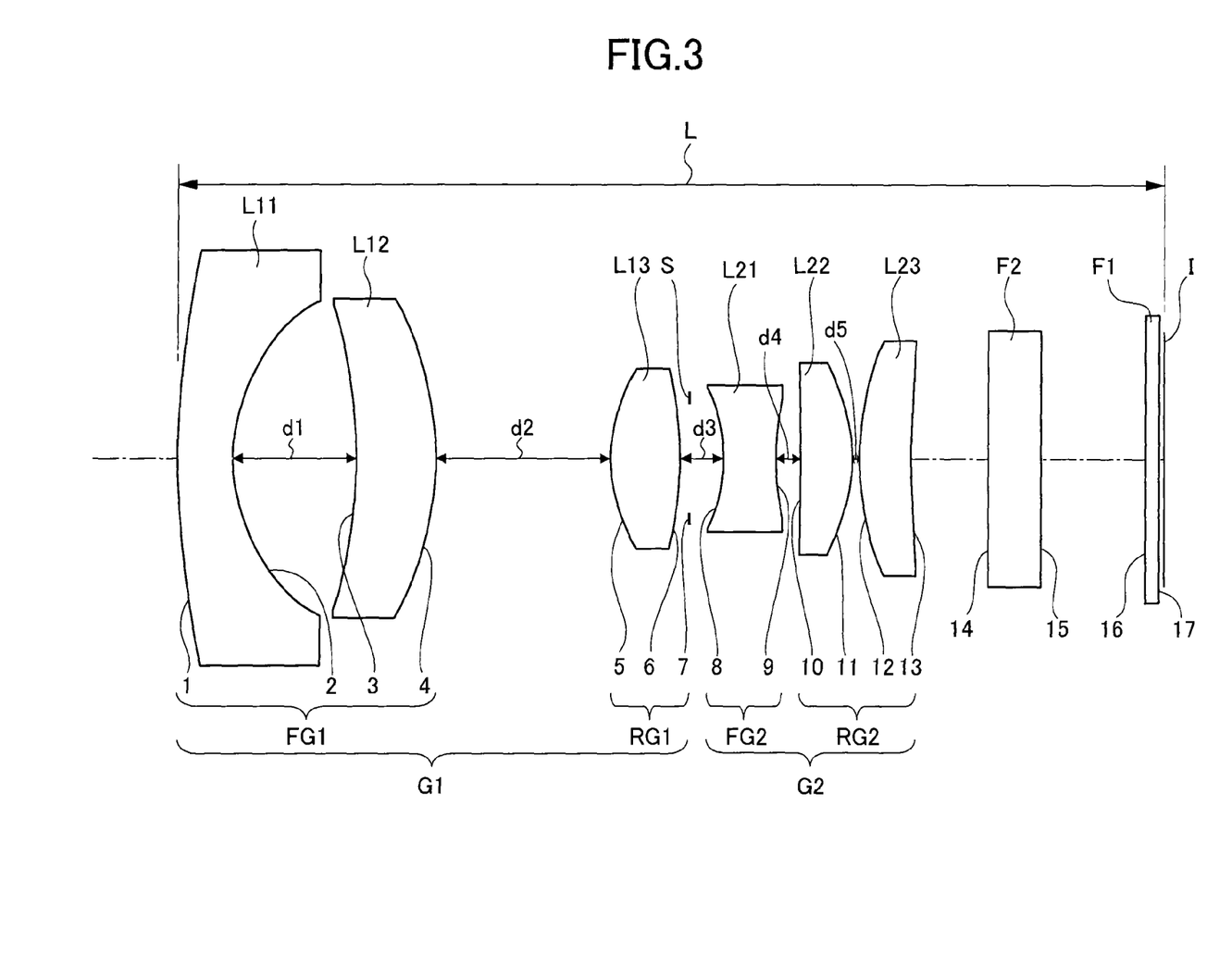
FIG. 3 is a view showing an optical arrangement of lenses of an imaging optical system according to a third embodiment of the present invention.
Figure 7:
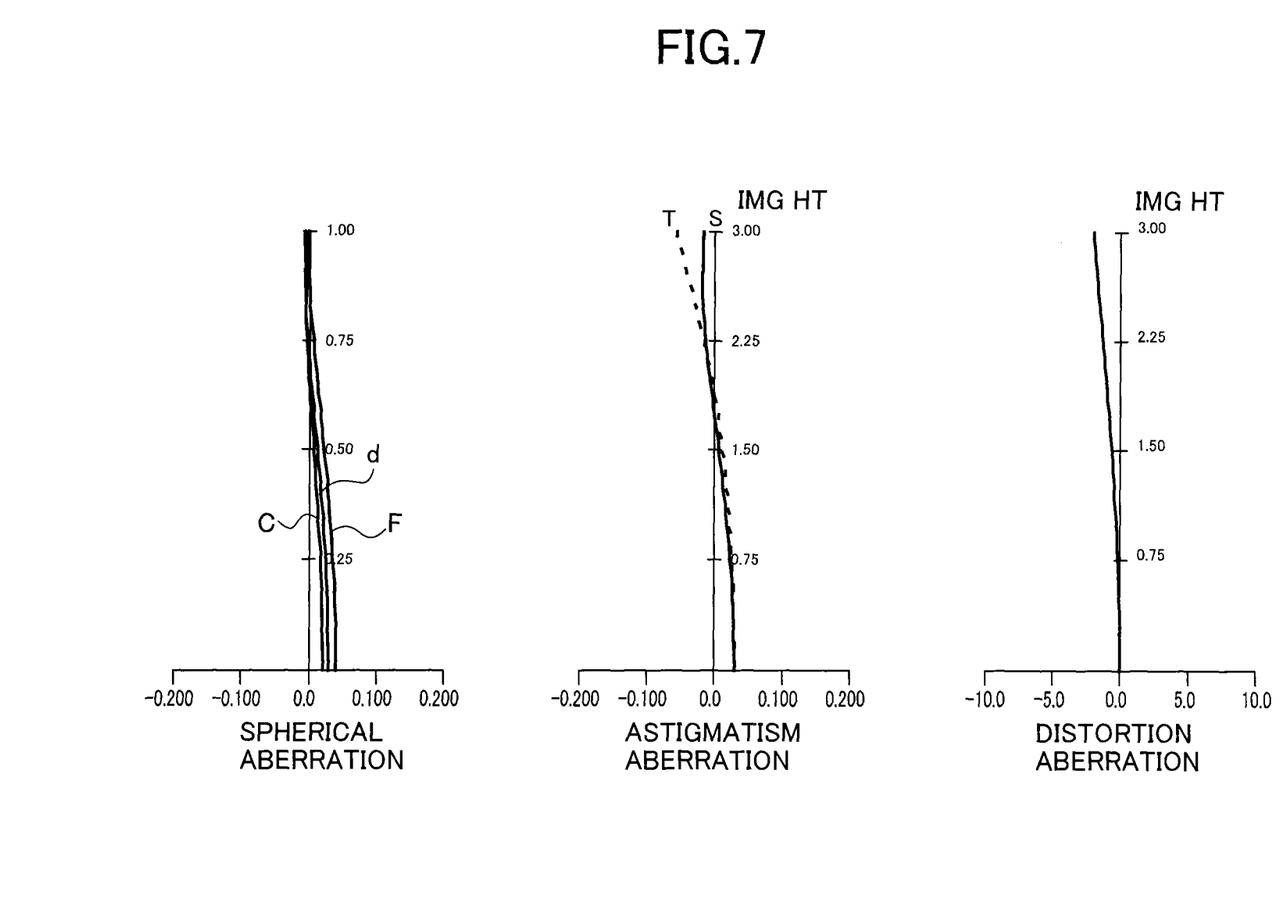
FIG. 7 is a view showing aberration curves of the imaging optical system according to the third embodiment.

A numerical example of the imaging optical system according to the third embodiment shown in FIG. 3 will be described. The following Table 3 shows optical properties of the optical elements. Further, FIG. 7 shows the aberration graph of a spherical aberration curve, an astigmatism aberration curve, and a distortion aberration curve of the imaging optical system according to the third embodiment.

TABLE 3

| SURFACE NO | r | d | Nd | vd |
|---|---|---|---|---|
| 1 | 24.78 | 1.60 | 1.5395 | 65.5 |
| 2 | 5.07 | 3.54 | | |
| 3 | −13.70 | 2.30 | 1.6944 | 30.5 |
| 4 | −8.70 | 5.02 | | |
| 5 | 4.56 | 2.00 | 1.5002 | 66.1 |
| 6 | −9.58 | 0.25 | | |
| 7 | ∞ | 1.00 | | |
| 8 | −4.48 | 1.50 | 1.7552 | 27.6 |
| 9 | 7.20 | 0.70 | | |
| 10 | −91.89 | 1.50 | 1.7318 | 45.8 |
| 11 | −5.06 | 0.20 | | |
| 12 | 7.72 | 1.50 | 1.6408 | 56.6 |
| 13 | 25.00 | 2.22 | | |
| 14 | ∞ | 1.50 | 1.5168 | 64.2 |
| 15 | ∞ | 3.00 | | |
| 16 | ∞ | 0.40 | 1.5168 | 64.2 |
| 17 | ∞ | 0.15 | | |

The focal length f of the imaging optical system is expressed as: f=6.2, F=2.8, ω=26.3.

Embodiment 4

Figure 4:
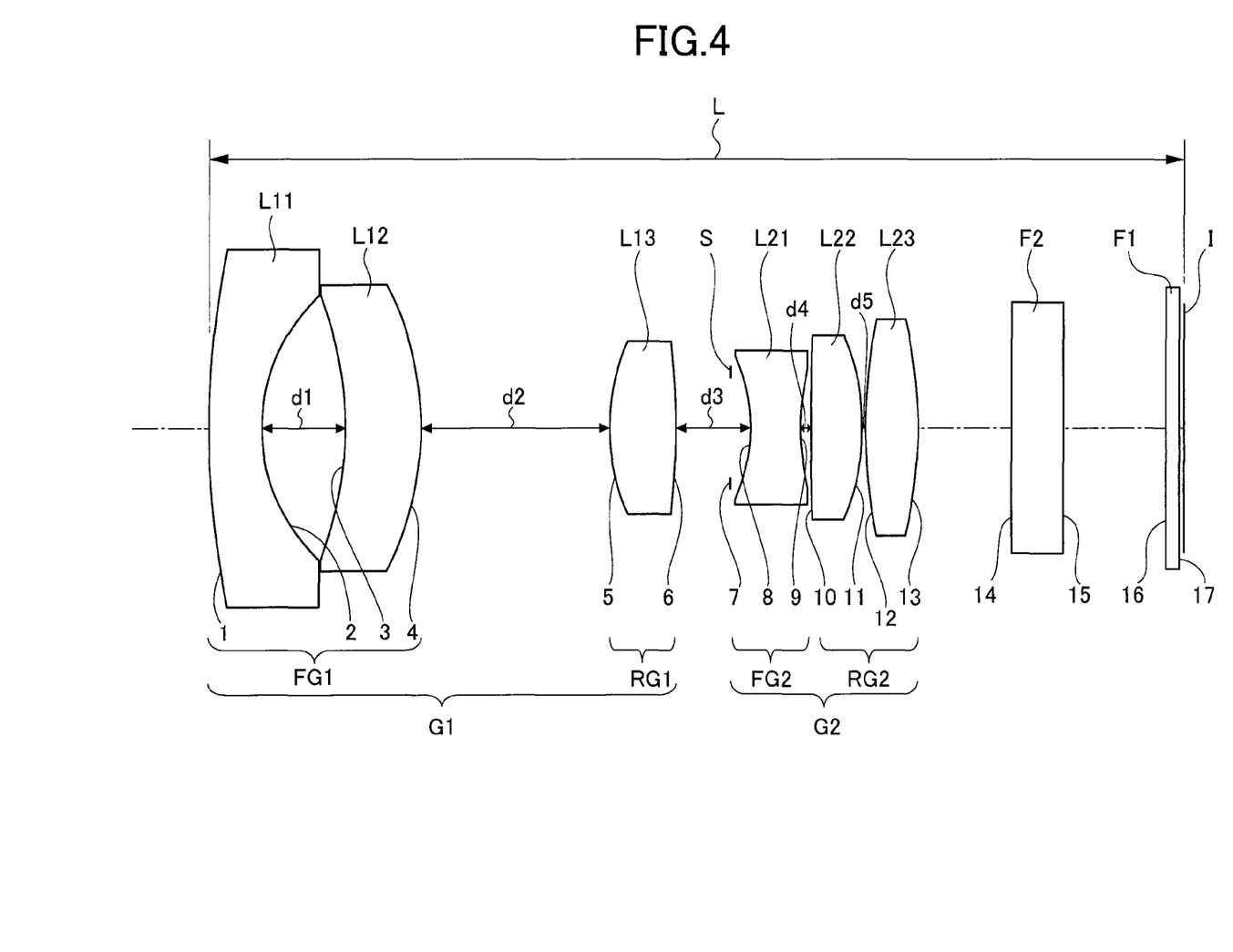
FIG. 4 is a view showing an optical arrangement of lenses of an imaging optical system according to a fourth embodiment of the present invention.
Figure 8:
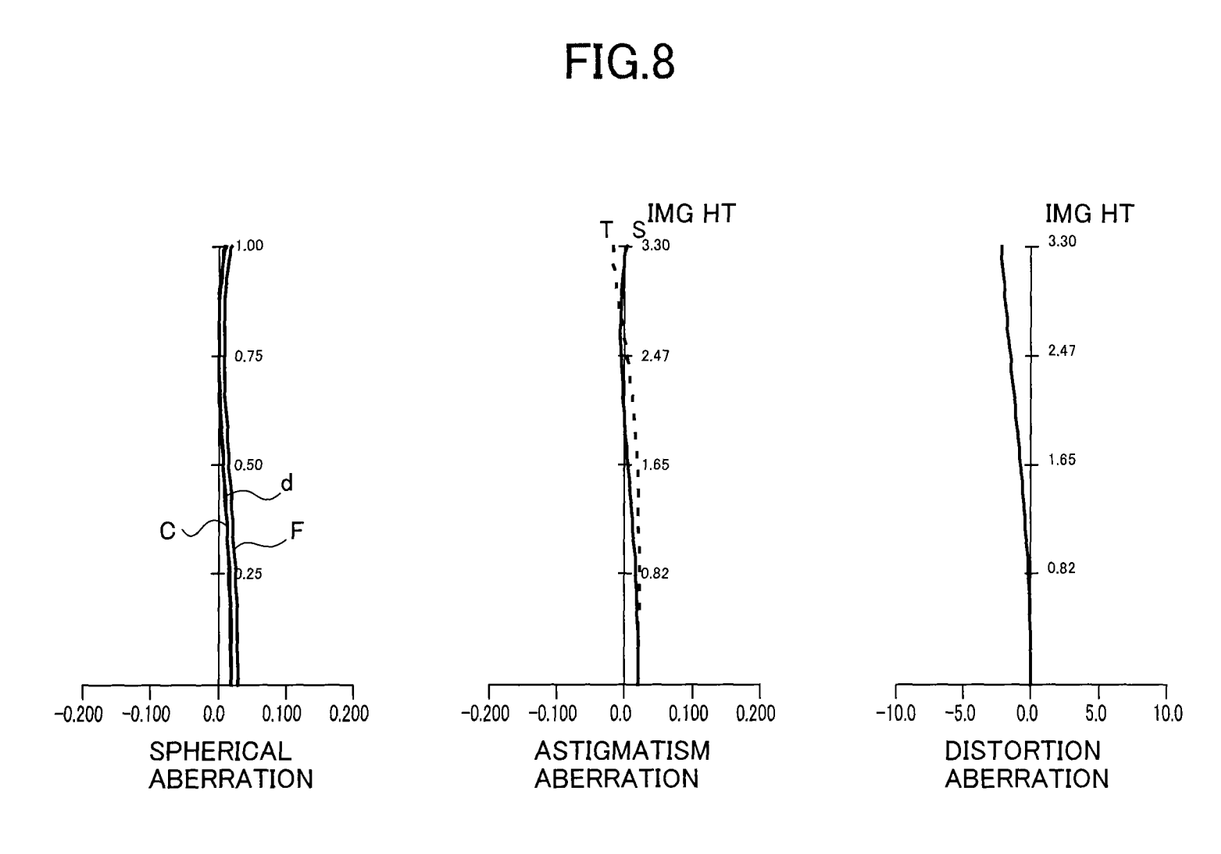
FIG. 8 is a view showing aberration curves of the imaging optical system according to the fourth embodiment.

A numerical example of the imaging optical system according to the fourth embodiment shown in FIG. 4 will be described. The following Table 4 shows optical properties of the optical elements. Further, FIG. 8 shows the aberration graph of a spherical aberration curve, an astigmatism aberration curve, and a distortion aberration curve of the imaging optical system according to the fourth embodiment.

TABLE 4

| SURFACE NO | r | d | Nd | vd |
|---|---|---|---|---|
| 1 | 23.98 | 1.55 | 1.5276 | 61.2 |
| 2 | 4.91 | 2.44 | | |
| 3 | −9.45 | 2.21 | 1.7440 | 44.9 |
| 4 | −8.49 | 5.50 | | |
| 5 | 5.60 | 1.97 | 1.6208 | 60.3 |
| 6 | −16.96 | 1.57 | | |
| 7 | ∞ | 0.60 | | |
| 8 | −4.78 | 1.47 | 1.7418 | 28.1 |
| 9 | 7.93 | 0.30 | | |
| 10 | 100.00 | 1.48 | 1.6813 | 50.9 |
| 11 | −6.66 | 0.10 | | |
| 12 | 13.86 | 1.55 | 1.6204 | 60.3 |
| 13 | −12.17 | 2.74 | | |
| 14 | ∞ | 1.50 | 1.5168 | 64.2 |
| 15 | ∞ | 3.00 | | |
| 16 | ∞ | 0.40 | 1.5168 | 64.2 |
| 17 | ∞ | 0.15 | | |

The focal length f of the imaging optical system is expressed as: f=6.5, F=2.6, ω=25.2.

Table 5 shows numerical values of the conditions (1) to (4) and numerical values of parameters of the imaging optical systems according to the first to fourth embodiments.

TABLE 5

| | EMBODIMENT 1 | EMBODIMENT 2 | EMBODIMENT 3 | EMBODIMENT 4 |
|---|---|---|---|---|
| f | 6.20 | 6.00 | 6.20 | 6.50 |
| f1 | 4.72 | 4.51 | 4.63 | 5.21 |
| f2 | 38.82 | 38.71 | 31.09 | 29.99 |
| f1F | −20.73 | −20.47 | −26.32 | −18.79 |
| f1R | 6.64 | 6.12 | 6.48 | 6.99 |
| L | 28.01 | 26.02 | 28.80 | 28.53 |
| (1) f2/f1 | 8.23 | 8.59 | 8.16 | 5.76 |
| (2) f1F/f | −3.34 | −3.41 | −5.48 | −2.89 |
| (3) f1R/f | 1.07 | 1.02 | 1.04 | 1.08 |
| (4) L/f | 4.52 | 4.34 | 4.57 | 4.39 |

As shown in Table 5, all the numerical values of the imaging optical systems according to the first to fourth embodiments of the present invention are within the ranges of the conditions (1) to (4). As clearly mentioned from these values and in FIGS. 5 to 8, the aberrations are sufficiently corrected in the imaging optical systems according to the first to fourth embodiments of the present invention. Besides, each of the imaging optical systems can achieve a wide viewing angle having a half viewing angle of about 30 degree with a small size. In addition, the imaging optical systems can reduce the distortion up to about 2%. That is, each of the imaging optical systems can achieve a high imaging performance.

Especially, when the imaging optical systems of the first to fourth embodiments are applied to a stereo camera apparatus, which has at least two cameras, in order to determine the distance from the sensing object; the optical systems can reduce the distortion aberrations amount. As a result, it can suppress the influence onto the capacity of and the processing ability of the circuit board. Besides, it can achieve a small-sized camera apparatus for sensing purpose. Furthermore, although the imaging optical systems applied to vehicle mounted cameras or to monitoring cameras are mostly used outside, the image optical systems can improve the resistance against temperature changes and environmental changes by having glass lenses for the all lenses.

Embodiment 5

Next, an example of the camera apparatus according to a fifth embodiment of the present invention will be described with reference to FIGS. 9A, 9B, and 10. The camera apparatus of the fifth embodiment is equipped with one of the imaging optical systems of the first to fourth embodiments. Note that the imaging optical system functions as a photographing optical system or as a moving image photographing optical system. Here, a configuration of a digital camera shown in FIGS. 9A, 9B, and 10 is explained as an example of the camera apparatus.

Note that the camera apparatus of the present invention should not be limited thereto. For instance, the imaging optical systems according to first to fourth embodiments can be applicable to a video camera for photographing moving images and to a film camera using silver salt films.

Here, similar to the digital cameras, portable information terminal devices such as mobile phones and personal data assistants (PDA), and personal terminal devices such as so-called smartphones and tablet terminals often have an imaging function. Since these devices include substantially identical function and configuration as the digital cameras, the imaging optical systems of the first to fourth embodiments can be applicable to these devices as well.

Figure 9A:
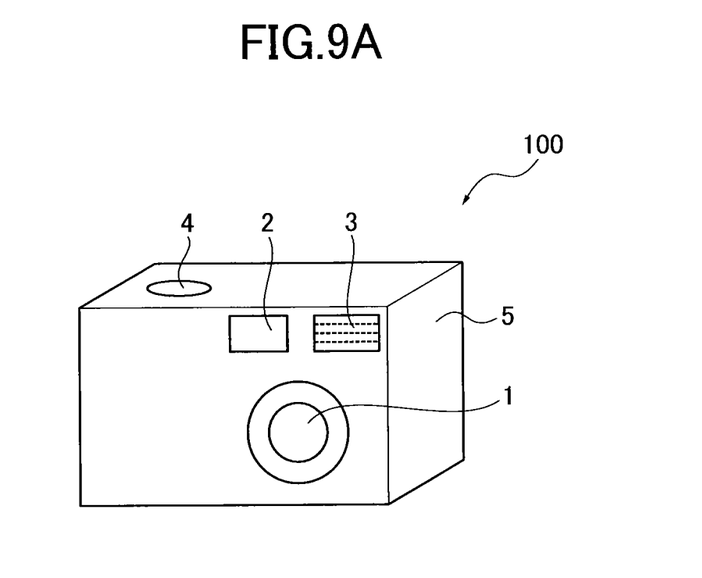
FIG. 9A is a front perspective view schematically showing an appearance of a camera apparatus according to a fifth embodiment.
Figure 9B:
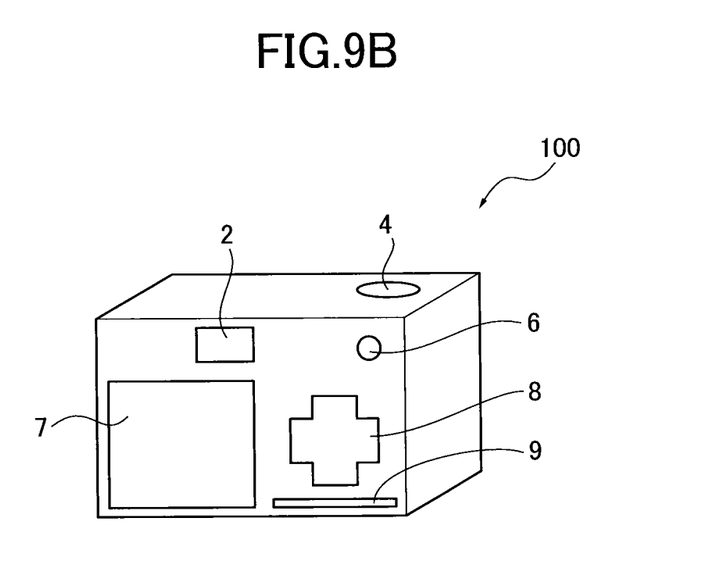
FIG. 9B is a back perspective view schematically showing an appearance of a camera apparatus according to the fifth embodiment.
Figure 10:
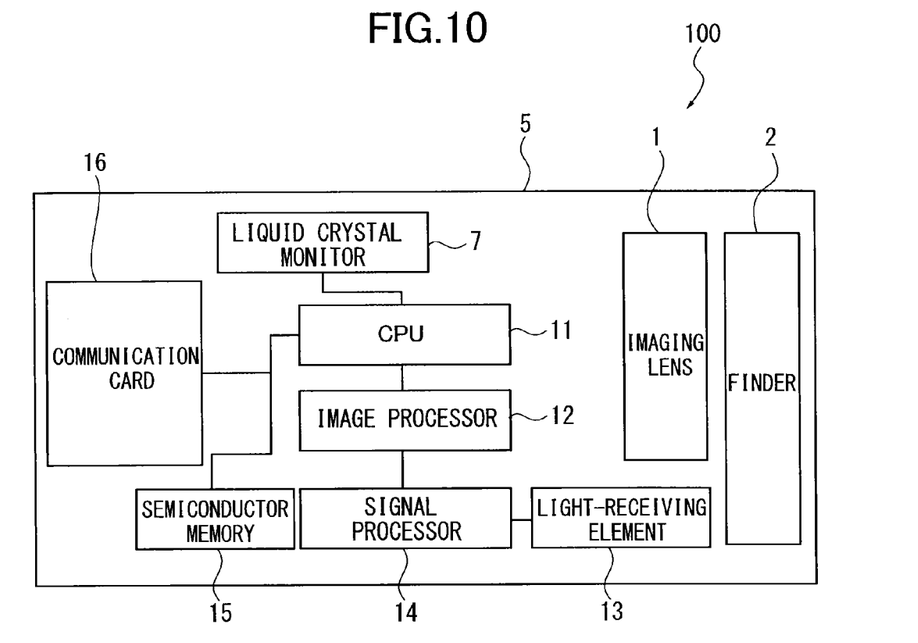
FIG. 10 is a block diagram showing a system configuration of the camera apparatus of FIG. 9A and FIG. 9B.

As illustrated in FIGS. 9A and 9B, the digital camera 100 of the fifth embodiment includes, inside a camera body 5, an imaging lens (imaging optical system) 1, an optical finder 2, a strobe light (electronic flash light) 3, a shutter button 4, a power switch 6, a liquid crystal monitor 7, an operation switch 8, a memory card slot 9, and the like. Further, as illustrated in FIG. 10, the digital camera 100 includes, inside the camera body 5, a central processing unit (CPU) 11, an image processor 12, a light-receiving element (imaging sensor) 13, a signal processor 14, a semiconductor memory 15, a communication card 16, and the like.

That is, the digital camera 100 includes the imaging lens 1 as the imaging optical system and light-receiving element (imaging sensor) 13 having CMOS imaging elements or CCD imaging elements. The digital camera 100, therefore, reads a subject image formed by the imaging lens 1 on the light-receiving element 13. Note that any one of the imaging optical systems according to the first to fourth embodiments can be applied to the imaging lens 1.

Outputs from the light-receiving element 13 are processed by the signal processor 14 controlled by the CPU 11 so as to be converted into digital image information. The digital image information generated by the signal processor 14 is further processed by the image processor 12 controlled by the CPU 11. The digital image information is then stored in the semiconductor memory 15 such as a non-volatile memory. Here, the semiconductor memory 15 may be a memory card inserted into the memory card slot 9 or a semiconductor memory built in the digital camera body.

The liquid crystal monitor 7 can display an image being taken or an image stored in the semiconductor memory 15. The images stored in the semiconductor memory 15 can be transmitted to outside via the communication card 16, etc. which is inserted to a communication card slot (although not particularly illustrated, it is possible to use the memory card slot 9 as the communication card slot as well).

The imaging lens 1 is covered by a lens barrier (not shown) when the camera is carried by a user. When the power switch 6 is turned ON, the lens barrier is opened such that the lens surface on the object side of the imaging lens 1 is exposed.

The operation switch 8 is operated (manipulated) to display an image stored in the semiconductor memory 15 on the liquid crystal monitor 7 or to transmit the stored image to outside via the communication card 16, etc. The semiconductor memory 15 and the communication card 16, etc. are used by inserting them to a corresponding dedicated slot such as the memory card slot 9 and the communication card slot or to a general (undedicated) slot.

As explained above, the digital camera (camera apparatus) of the fifth embodiment is configured to include the imaging optical system of the first to fourth embodiments. With this, the digital camera can achieve a wide viewing angle having a half viewing angle of about 30 degree with a small size. Further, the digital camera can reduce the distortion up to about 2%. That is, the digital camera can achieve a high imaging performance. In addition, since the imaging images are converted into digital image information, the digital camera is more applicable for the sensing technology such as image analysis and image processing.

Embodiment 6

Next, an example of the stereo camera apparatus according to a sixth embodiment of the present invention will be described with reference to FIG. 11. The stereo camera apparatus of the sixth embodiment is equipped with one of the imaging optical systems of the first to fourth embodiments. Note that the imaging optical system functions as a photographing optical system or as a moving image photographing optical system. Here, a configuration of a vehicle-mounted stereo camera shown in FIG. 11 is explained as an example of the stereo camera apparatus.

Figure 11:
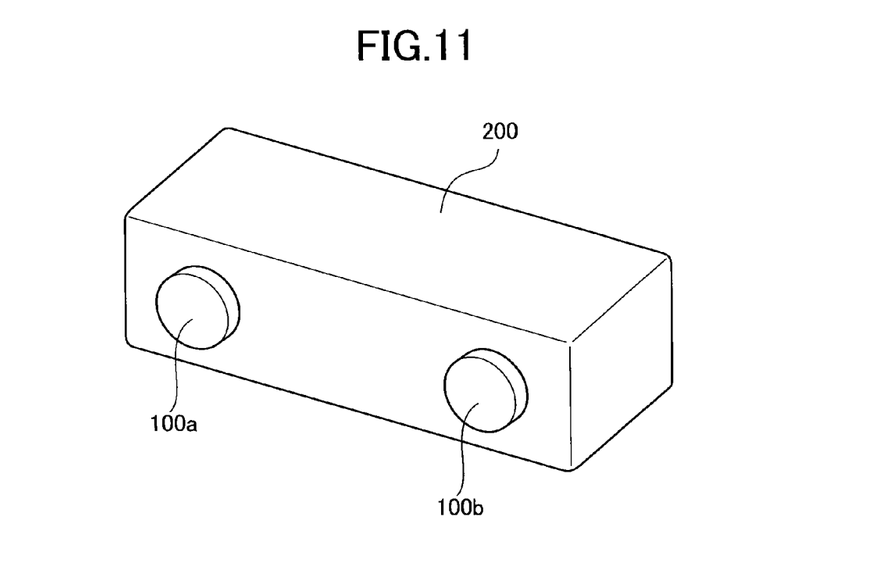
FIG. 11 is an explanatory view for explaining a stereo camera apparatus according to a sixth embodiment.

As shown in FIG. 11, the stereo camera 200 of the sixth embodiment includes two camera apparatuses 100a, 100b. The camera apparatuses 100a, 100b are each equipped with an imaging lens 1 corresponding to the imaging optical system according to the first to fourth embodiments. The camera apparatuses 100a, 100b may have the same configuration as the camera apparatus 100 of the fifth embodiment shown in FIG. 10, but should not be limited thereto. Digital image information output from the camera apparatuses 100a, 100b are appropriately corrected and image-processed by the image processor and the like of the stereo camera 200. As a result, it is possible to apply the stereo camera 200 for sensing purpose.

As explained above, the vehicle-mounted camera (stereo camera apparatus) of the sixth embodiment is configured to include the imaging lens 1 corresponding to the imaging optical system of the first to fourth embodiments. With this, it becomes possible to achieve a wide viewing angle having a half viewing angle of about 30 degree with a small size. Further, the vehicle-mounted camera can reduce the distortion up to about 2%. That is, the vehicle-mounted camera can achieve a high imaging performance as well as a high environmental resistance. In addition, since the imaging images are converted into digital image information, the vehicle-mounted camera is more applicable for the sensing technology such as image analysis and image processing.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A single focal imaging optical system, comprising, in order from an object side:
   a first lens group with a positive refractive power;
   an aperture stop; and
   a second lens group with a positive refractive power; wherein
   the first lens group includes, in order form the object side:
      a first front lens group with a negative refractive power, the first front lens group including one negative lens and one positive lens, and
      a first rear lens group with a positive refractive power, the first rear lens group being a single lens,
   the first front lens group includes, in order from the object side, a negative meniscus lens having a concave surface on an image side and a convex surface on the object side, and a positive meniscus lens having a concave surface on the object side,
   the first rear lens group includes a biconvex lens,
   the second lens group includes, in order from the object side, a second front lens group with a negative refractive power and a second rear lens group with a positive refractive power, and
   the imaging optical system satisfies a following condition (1):

$$3.2 < f2/f1 < 9.0 \tag{1}$$

where f1 represents a composite focal length of the first lens group and f2 represents a composite focal length of the second lens group.

2. The imaging optical system according to claim 1, wherein all lenses are glass spherical lenses.

3. The imaging optical system according to claim 1, wherein the imaging optical system satisfies following conditions (2) and (3):

$$-5.7 < f1F/f < -2.8 \quad (2)$$

$$0.7 < f1R/f < 1.4 \quad (3)$$

where f represents a focal length for a d-line of the imaging optical system, f1F represents a focal length of the first front lens group, and f1R represents a focal length of the first rear lens group.

4. The imaging optical system according to claim 1, wherein the second lens group includes, in order from the object side:

the second front lens group including a biconcave lens, and the second rear lens group including a positive lens having a convex surface on the image side and a positive lens having a convex surface on the object side.

5. The imaging optical system according to claim 1, wherein an air interval between the first front lens group and the first rear lens group is greater than any other air intervals in the first tens group.

6. The imaging optical system according to claim 1, wherein the imaging optical system satisfies a following condition (4):

$$3.0 < L/f < 5.9 \quad (4)$$

where f represents a focal length for a d-line of the imaging optical system and L represents a distance from a lens end on the object side of the first lens group to an image plane.

7. A camera apparatus comprising the imaging optical system according to claim 1.

8. The camera apparatus according to claim 7, wherein the camera apparatus has a function to convert an imaging image into digital image information.

9. A stereo camera apparatus comprising:

two of the imaging optical systems according to claim 1.

10. The stereo camera apparatus according to claim 9, wherein the stereo camera apparatus has a function to convert an imaging image into digital image information.

* * * * *